US011673437B2

(12) United States Patent
Bales et al.

(10) Patent No.: US 11,673,437 B2
(45) Date of Patent: Jun. 13, 2023

(54) TIRE CHANGE TOOL

(71) Applicant: Government of the United States, as represented by the Secretary of the Air Force, Wright-Patterson AFB, OH (US)

(72) Inventors: John D. Bales, Beavercreek, OH (US); Thomas G. Benner, Beavercreek, OH (US); Stuart P. Baker, Dayton, OH (US); Brent J. Young, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 616 days.

(21) Appl. No.: 16/801,219

(22) Filed: Feb. 26, 2020

(65) Prior Publication Data

US 2021/0260939 A1    Aug. 26, 2021

(51) Int. Cl.
*B60C 25/02* (2006.01)
*B64F 5/40* (2017.01)

(52) U.S. Cl.
CPC .............. *B60C 25/025* (2013.01); *B64F 5/40* (2017.01)

(58) Field of Classification Search
CPC ... B60B 29/001; B60B 29/003; B60B 29/005; B60B 29/007; B60B 29/00; B60B 30/08; B60B 30/06; B60B 31/06; B60B 2900/3313; B25B 23/00; B60C 25/0503; B60C 25/0506; B60C 25/025; B64F 5/40

USPC ............... 81/462; 157/1.1, 1.3, 1.43, 14, 21
See application file for complete search history.

(56) References Cited

U.S. PATENT DOCUMENTS

| 2,447,919 | A | * | 8/1948 | Teigen | .................. B60B 29/007 81/462 |
| 5,129,290 | A | * | 7/1992 | Haviv | ................. B25B 23/0078 81/57.24 |
| 5,553,991 | A | * | 9/1996 | Ferreira | ............... B25H 1/0028 280/79.6 |
| 10,065,454 | B2 | * | 9/2018 | Coetzee | .................... B25D 1/16 |
| 2003/0115732 | A1 | * | 6/2003 | Bergman | ................ B25B 27/02 29/254 |
| 2015/0082633 | A1 | * | 3/2015 | Tailpied | ................ F01D 25/285 81/121.1 |

* cited by examiner

*Primary Examiner* — Tyrone V Hall, Jr.
*Assistant Examiner* — Makena S Markman
(74) *Attorney, Agent, or Firm* — AFMCLO/JAZ; Timothy M. Barlow (57) ABSTRACT

A tire change tool comprising a generally circular and planar faceplate having a hub side and a user side, the hub side and user side being generally parallel; an upper elbow flexibly connected to the faceplate by an interface; an arm connected to the upper elbow at a first end, and connected to a lower elbow at a lower end; and a footplate flexibly connected to the lower end of the arm by the lower elbow, wherein the faceplate and the interface comprise co-aligned apertures, the co-aligned apertures having an axis perpendicular to the plane of the faceplate. A length adjustment mechanism may be incorporated into the arm and adapted to permit the arm's length to be changed. The arm may include an upper section and a lower section adjustable connected by an adjustment mechanism adapted to permit the arm's length to be changed.

3 Claims, 11 Drawing Sheets

TIRE CHANGE TOOL

RIGHTS OF THE GOVERNMENT

The invention described herein may be manufactured and used by or for the Government of the United States for all governmental purposes without the payment of any royalty.

FIELD OF THE INVENTION

The present invention relates generally to tools and, more particularly, to tools for assisting aircraft maintainers in securing landing gear nuts.

BACKGROUND OF THE INVENTION

Figure 1:
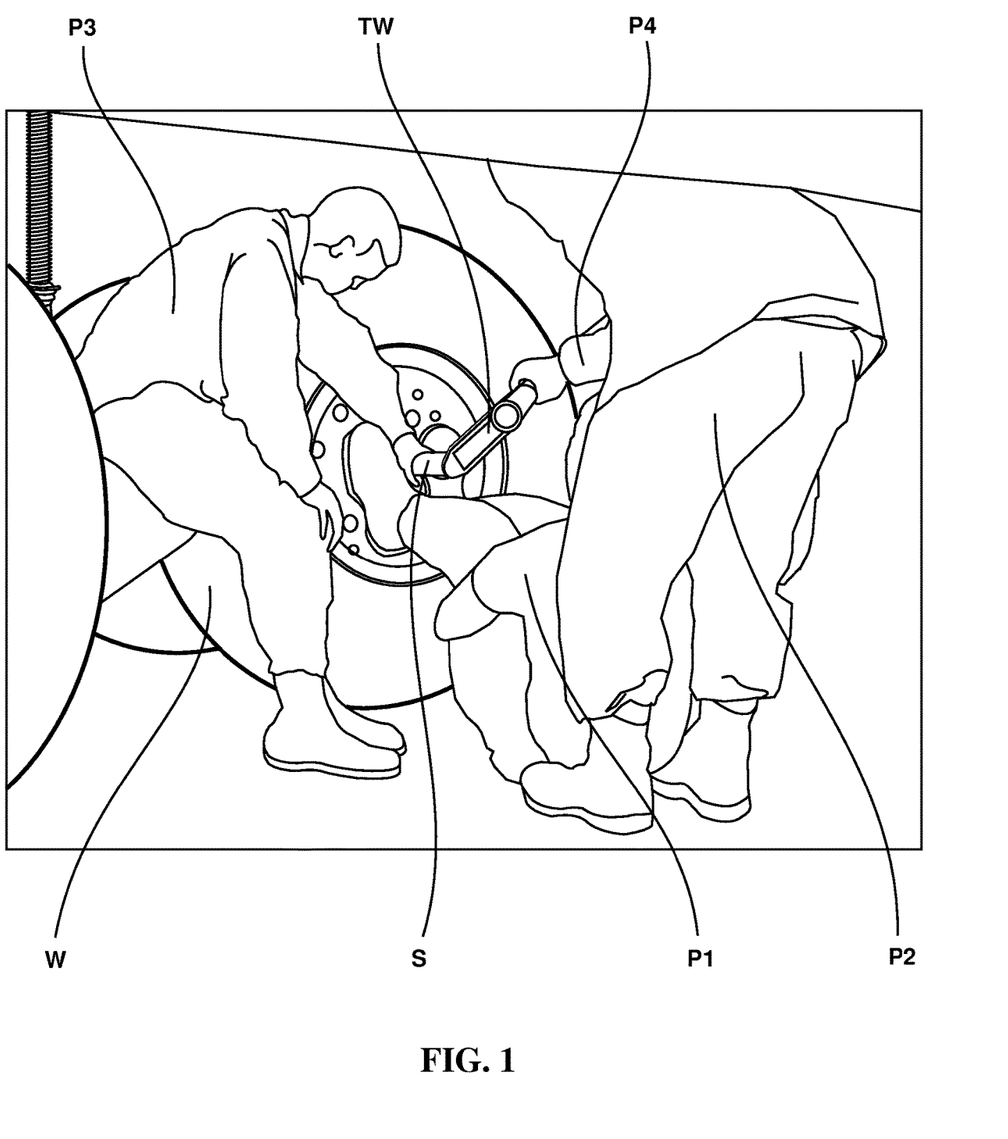
FIG. 1 depicts a prior art solution for applying the proper torque to aircraft wheel fasteners.

It is of critical importance that aircraft wheels are secured to the aircraft properly. Where the hub has a single, large central nut, i.e. hub nut, it is very important that the wheel is seated against the bearings while the hub nut is torqued to the proper specification. A spanner is often used to transmit torque from the torque wrench to the nut. However, the high torque (~200 ft lbs) creates an unbalanced moment about the spanner wrench and tends to roll the spanner out of position. As depicted in FIG. 1, according to prior art practice, it takes at least four (4) persons to properly torque a hub nut. A first person P1 sits on the ground facing the wheel W and hub and braces the spanner S with his feet, pressing the spanner S squarely against the hub nut while bracing his upper body against a second person P2. A third person P3 aids in stabilizing the shaft of the wrench S and ensures that the spanner wrench is properly aligned and coupled with the hub nut as torque is applied through a torque wrench TW by a fourth person P4. This practice puts the first person P1 on the ground at risk from a falling spanner S, which is steel and weighs ~15 lbs., and wastes manpower.

SUMMARY OF THE INVENTION

The present invention overcomes the foregoing problems and other shortcomings, drawbacks, and challenges of properly and safely torqueing hub nuts. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a tire change tool comprises a generally circular and planar faceplate having a hub side and a user side, the hub side and user side being generally parallel; an upper elbow flexibly connected to the faceplate by an interface; an arm connected to the upper elbow at a first end, and connected to a lower elbow at a lower end; and a footplate flexibly connected to the lower end of the arm by the lower elbow, wherein the faceplate and the interface comprise co-aligned apertures, the co-aligned apertures having an axis perpendicular to the plane of the faceplate. This tool reduces the manpower requirements for changing large and heavy tires, while improving safety.

The tire change tool may further include a length adjustment mechanism incorporated into the arm and adapted to permit the arm's length to be changed. This makes it possible for the same tool to be used with many different sized tires and wheels. Towards that end, the arm may comprise an upper section and a lower section adjustable connected by an adjustment mechanism adapted to permit the arm's length to be changed.

A bearing may be incorporated into the co-aligned apertures of the faceplate and interface, the bearing having a central aperture parallel to the co-aligned apertures of the faceplate and interface. The bearing permits the socket to ride in a low-friction aperture for maximum ease of use and more accurate torque wrench operation.

A handle may be fixed to the interface opposite the faceplate. The handle provides a safe and convenient grip for a user to apply pressure against the wheel and hub, while aiding the accurate positioning of the tool against the wheel and hub.

One or more relief grooves may be included in the hub side of the faceplate. A unique faceplate may be used for each different type of wheel and hub, if desired.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The purpose of the present invention is to securely seat the spanner wrench or socket S against the hub nut while it is being torqued to specification.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The disclosed invention is a tool to assist aircraft maintainers in securing the main landing gear spanner wrench S against a hub nut to ensure proper seating of the spanner wrench S without affecting the torque applied to the hub nut.

Figure 2:
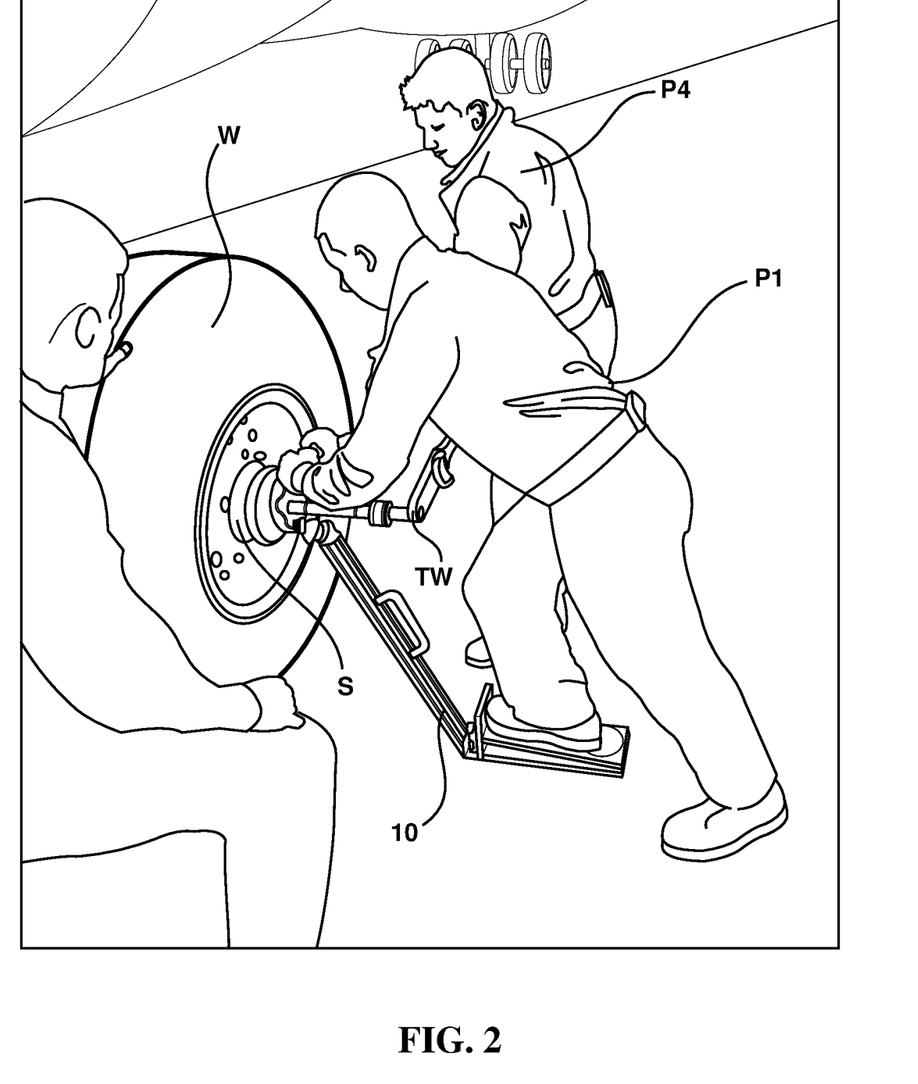
FIG. 2 depicts an embodiment of a tire change tool in use, according to an embodiment of the invention.

As illustrated in FIG. 2, the disclosed tire change tool 10 eliminates the need for two of the four persons required in the prior art (see FIG. 1); now only two (2) persons are needed to properly torque a wheel nut. Only the first person P1 and fourth person P4 of the prior art are needed. The first person P1 places the faceplate 12, which may be nylon, a metal, or another polymer, over the spanner S and adjusts the angle of the arm 18 and the lower elbow 20 so that manual pressure of the first person P1 against the handle 26 forces the spanner S squarely against the hub nut (not shown).

Figure 3:
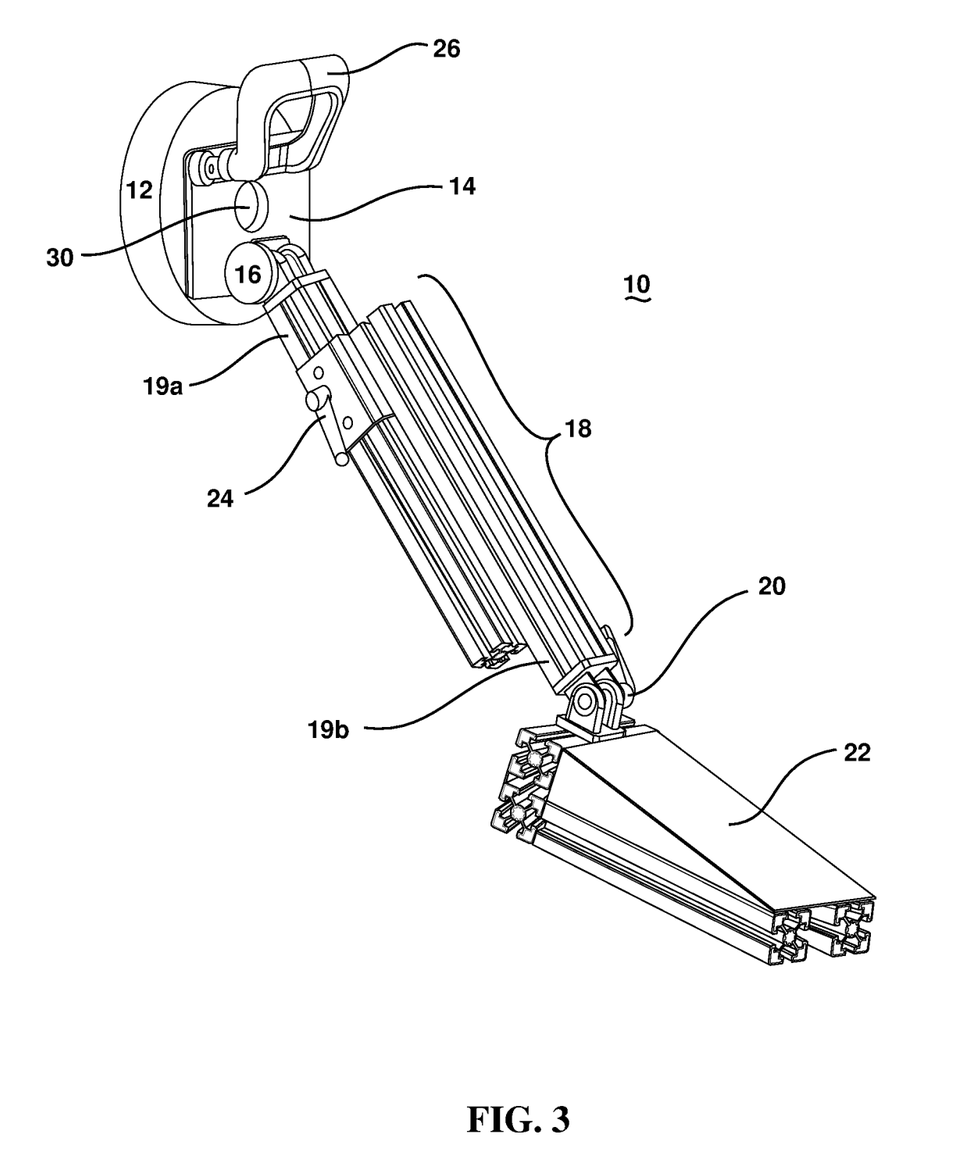
FIG. 3 depicts a perspective view of a tire change tool, according to an embodiment of the invention.
Figure 4:
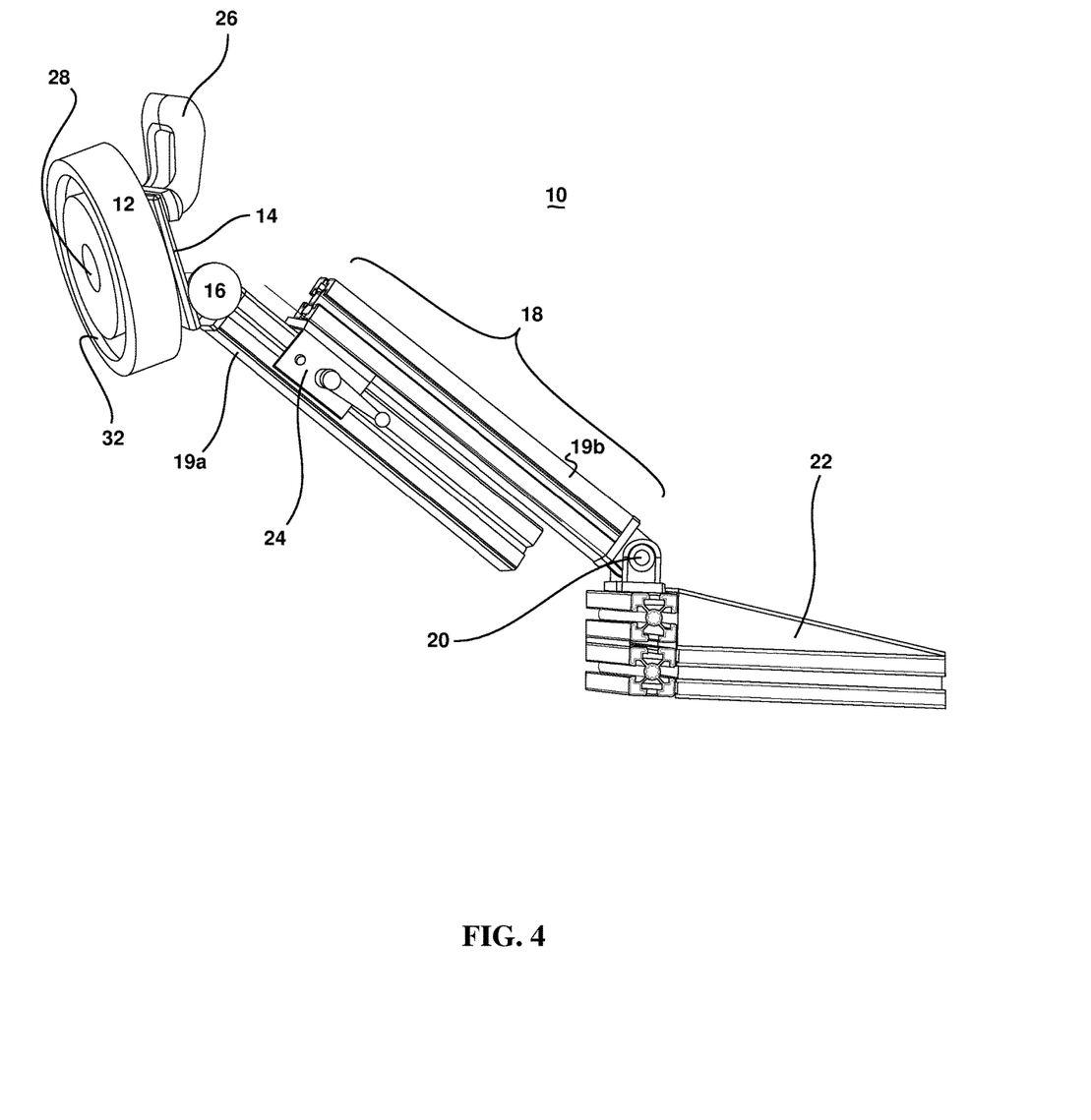
FIG. 4 depicts a perspective view of a tire change tool, according to an embodiment of the invention.
Figure 5:
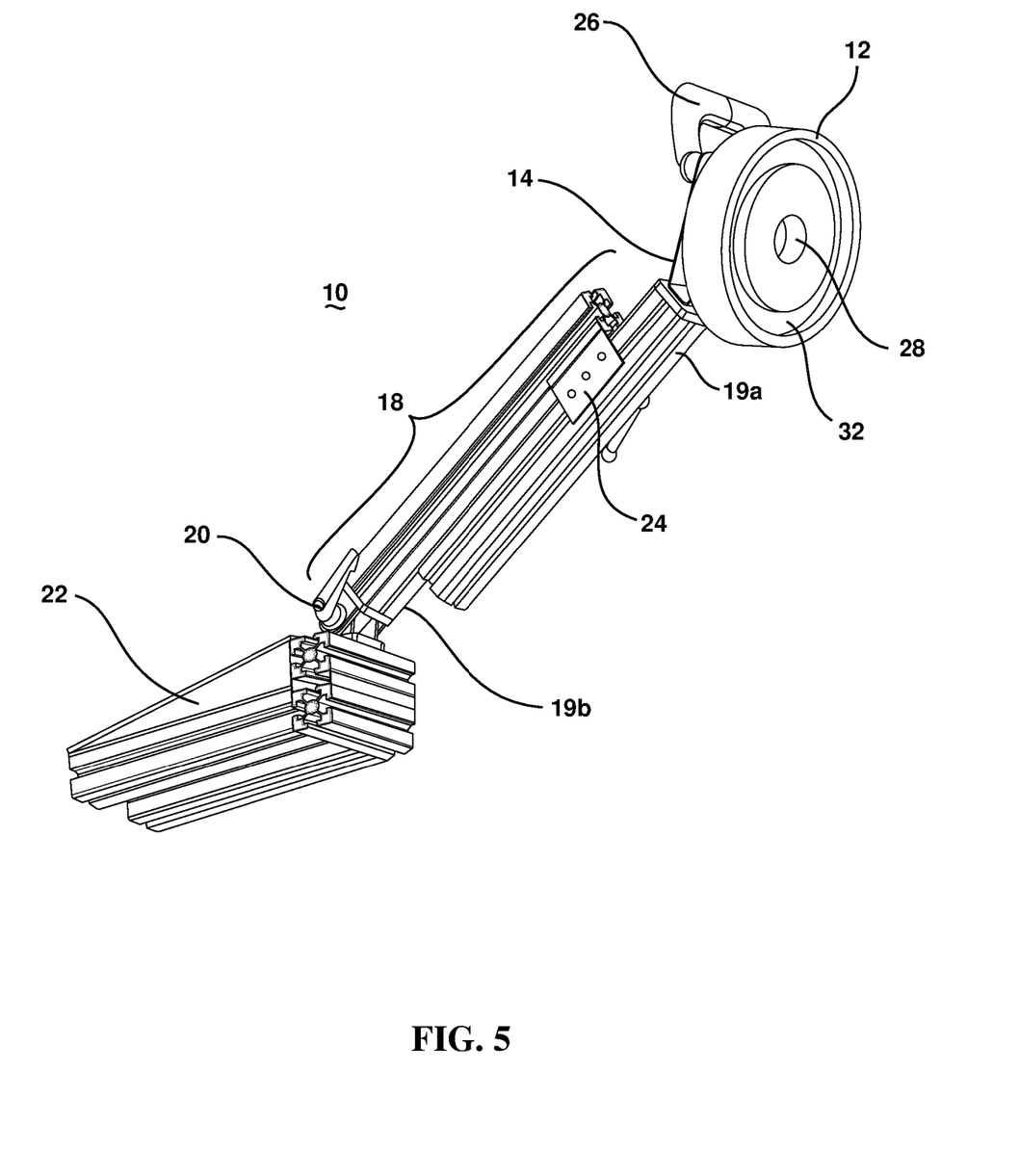
FIG. 5 depicts a perspective view of a tire change tool, according to an embodiment of the invention.

FIGS. 3-5 present perspective views of the tire change tool 10. The faceplate 12 is attached to an interface 14 which is fixed to the upper elbow 16. The faceplate 12 and interface 14 each have an aperture 28, 30 through with the spanner S extends. The faceplate 12 may include one or more relief grooves 32 or other features designed to conform the faceplate 12 to the spanner S, wheel W, and hub so that the faceplate 12 mates tightly against the spanner S. This arrangement aids in ensuring that the spanner S and wheel W are squarely against the hub for proper torque application.

The upper elbow 16 is fixed to the arm 18, and a footplate 22 is attached to the opposite end of the arm 18 by a lower elbow 20. The arm 18 may include two or more sections 19a, 19b connected together by an adjustment mechanism 24, e.g. a clamp. An adjustable arm 18 enables the tool 10 to be tailored to the height a particular hub. The footplate 22 and the length of the tool, via the adjustment mechanism 24, may be adjusted as appropriate for the work at hand.

The footplate 22 may be used to anchor the tool 10 by the application of the first person's weight (see FIG. 2), and the interface 14 may include a handle 26 which may be pushed by the first person P1 to apply an appropriate amount of on-axis force so as to counteract any off-axis moment created by the torque of the wrench TW. The interface 14 or the faceplate 12 may include a bearing (not shown) concentric with the apertures 28, 30 to support the shaft of the spanner S, to permit the rotating motion of the spanner S, and to prevent the tool 10 from affecting the torque values being applied and measured.

Aluminum may be a preferred material for most of the components of the tool 10, but different materials may be substituted at increased cost and/or weight. Different types of joints other than the elbow joints could be used.

The principle of the tool and its mode of operation renders it applicable to any aircraft or automotive wheel that uses a single hub nut system. The adjustment mechanism 24 on the arm 18 permits the tool 10 to be adapted to the height of any wheel, and the faceplate may be changed to adapt to the particular wheel, hub, and spanner being used, but the rest of the tool would remain identical.

Figure 6:
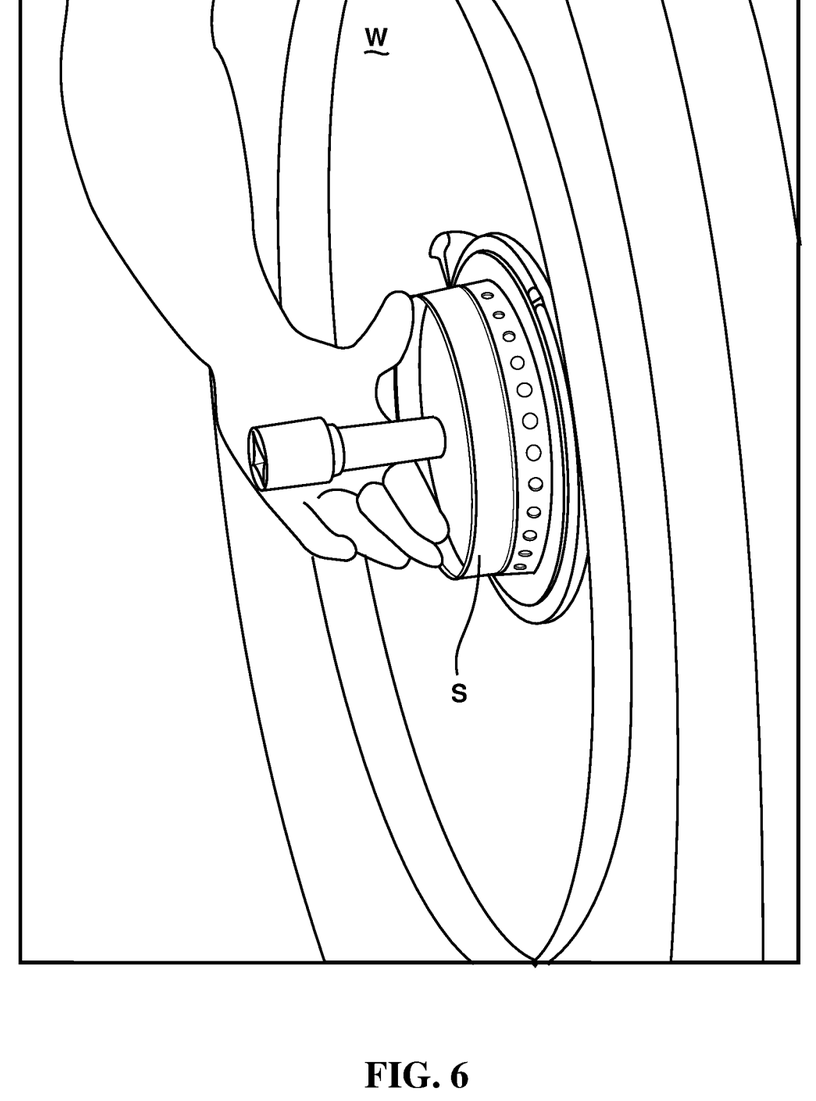
FIG. 6 depicts a wheel nut spanner manually placed in position on a wheel nut.
Figure 7:
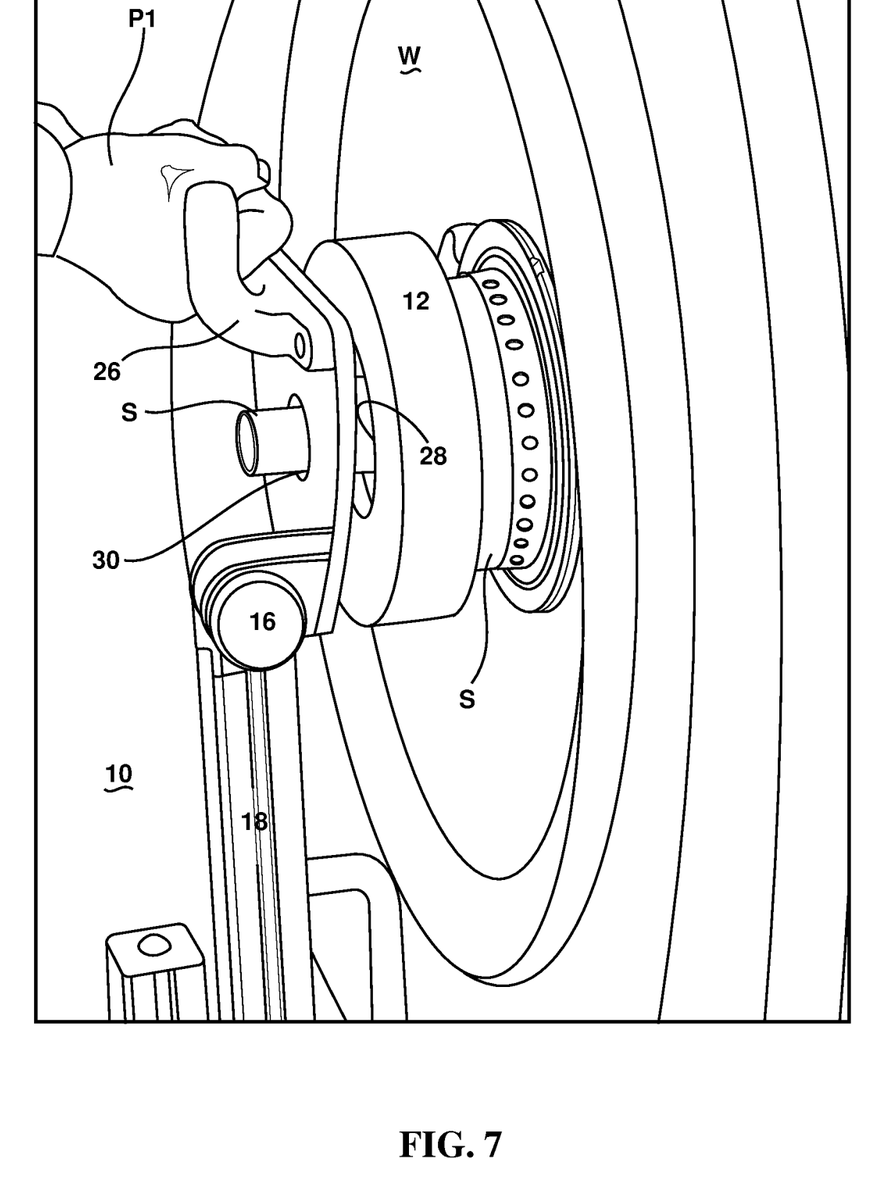
FIG. 7 presents a perspective view of the tire change tool being mounted against a spanner wrench.
Figure 8:
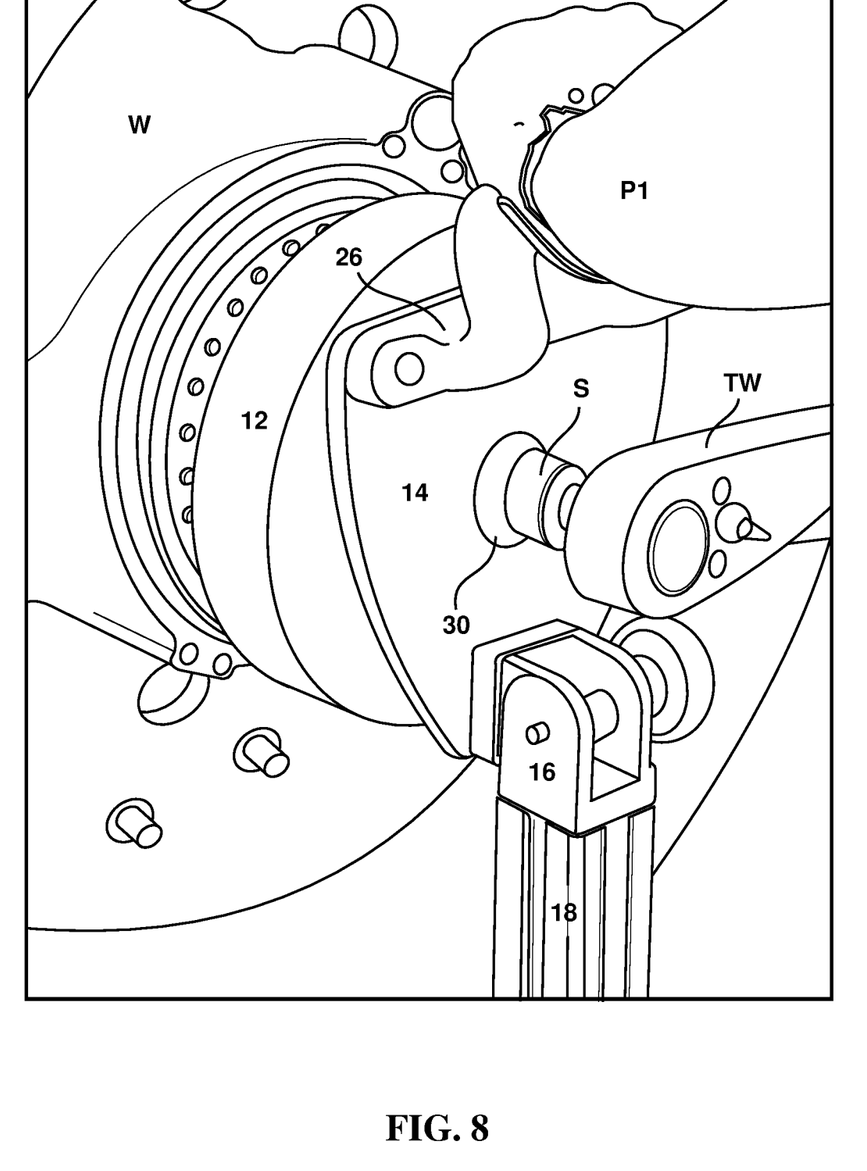
FIG. 8 presents a perspective view of the tire change tool being mounted against a spanner wrench with a torque wrench engaged.

FIG. 6 presents a perspective view of a spanner S manually held against a hub nut of a wheel of a C-5 Galaxy aircraft, for example, as is known in the prior art. FIGS. 7-8 provide perspective views of the tool 10 in use with the prior art spanner S and wheel W. The tool 10 may be scaled up or down to suit any wheel and hub arrangement. The dimensions provided below are specifically for the C-5 aircraft and are provided as an illustration without intending to be limiting. The tool was found to be capable of working with all varieties of spanner wrenches, i.e. those that engage both the inside or the outside of a nut or fastener, as well as sockets. Regardless of the particular application, the tool may be effectively the same, while being scaled up or down; all applications perform the same function: keeping the spanner wrench/socket seated by resisting the off-center moment that is created with the torque wrench. The only distinct characteristic between the various applications may be the size and/or contours of the faceplate 12 that bears against the spanner S or socket.

Figure 9:
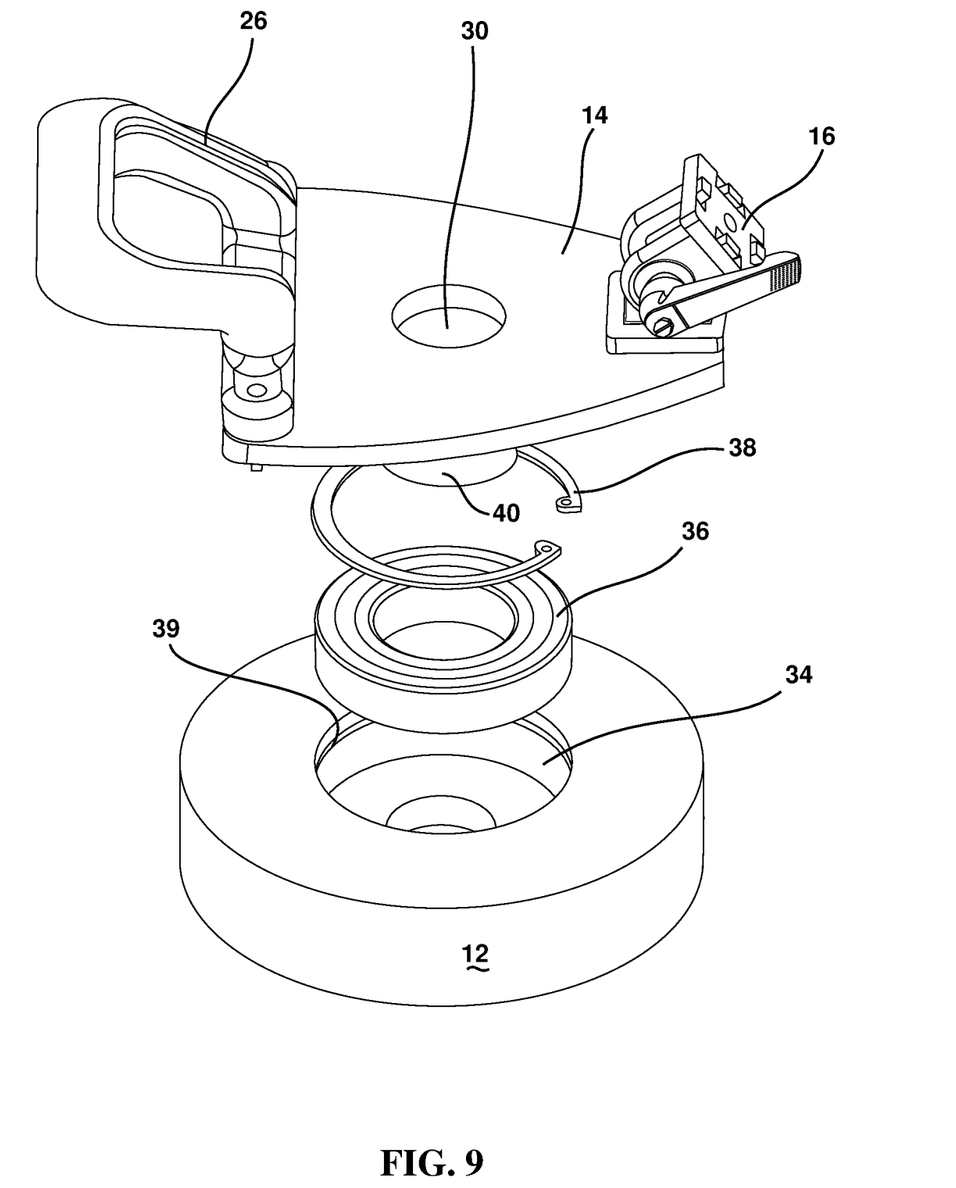
FIG. 9 presents an elevated perspective view of components of the tire change tool, according to an embodiment of the invention.
Figure 10:
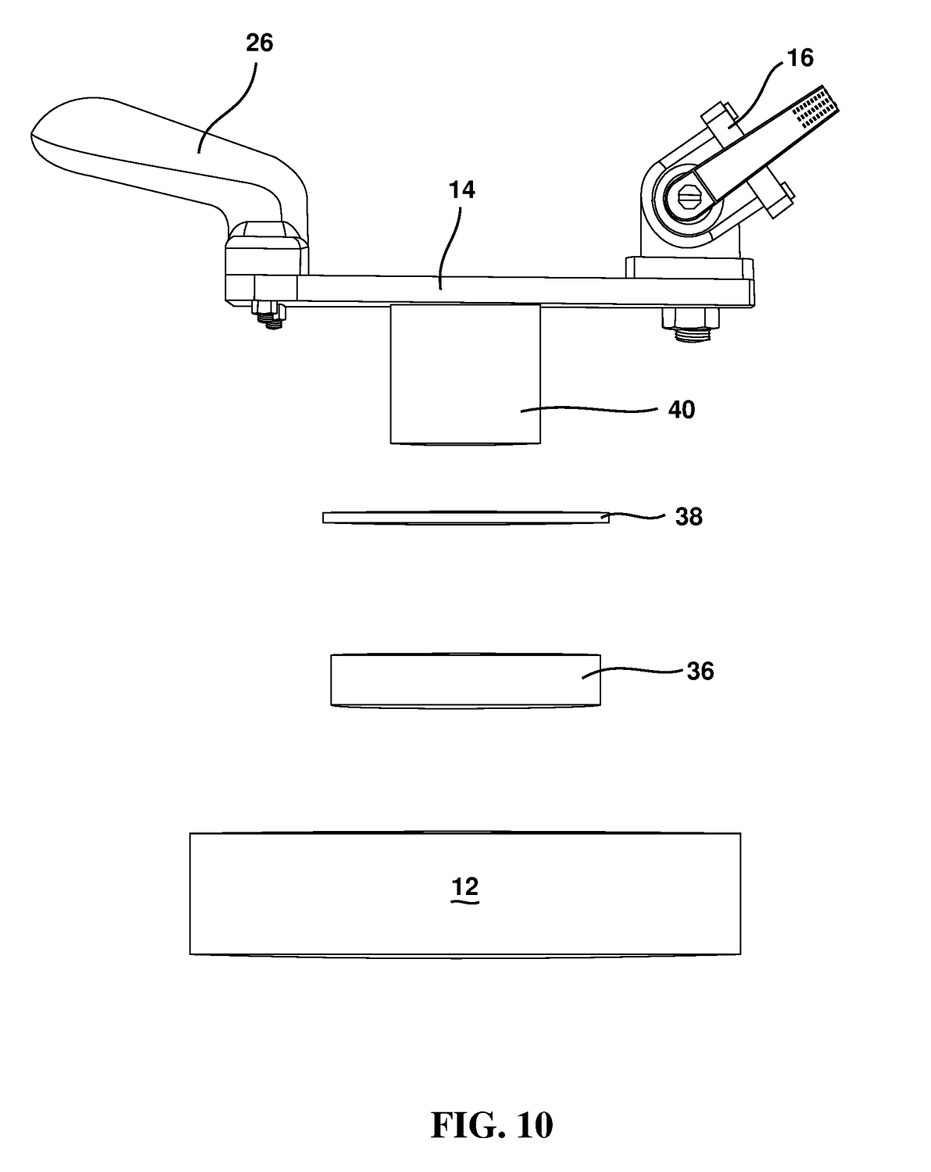
FIG. 10 presents a side view of components of the tire change tool, according to an embodiment of the invention.
Figure 11:
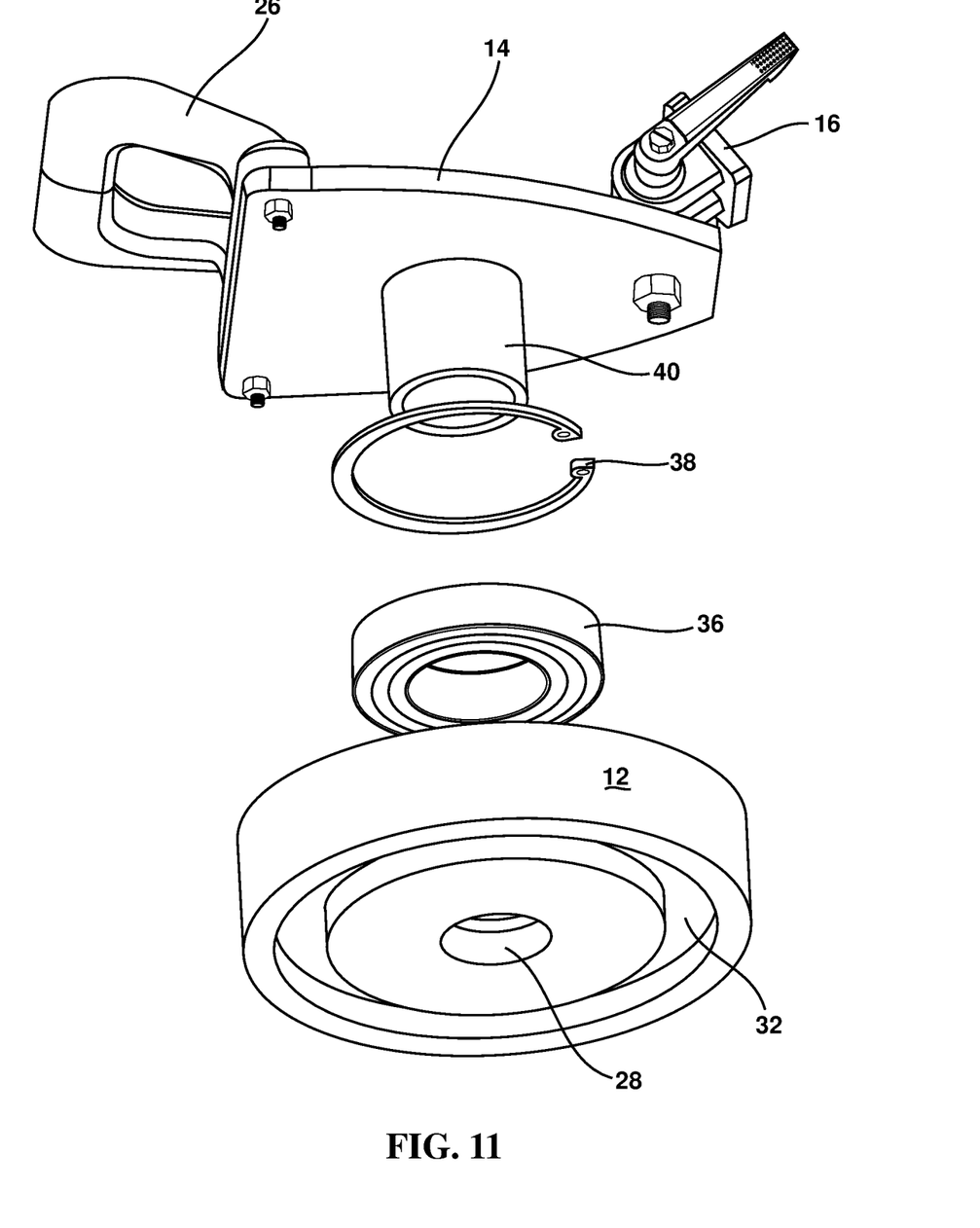
FIG. 11 presents a perspective view of components of the tire change tool, according to an embodiment of the invention.

As depicted in FIGS. 9-11, the tool 10 may include a nylon faceplate 12, which may be about 8" in diameter, with a relief groove 32 facing the hub and wheel W such as to accommodate any nuts or other features extending from the back of the spanner S. In one embodiment, the central hole 30 may be about 1.75" to permit the central post of the spanner S to pass. The rear face of the faceplate 12 may have a flange 34 formed therein, e.g. about 21 mm deep and 100 mm in diameter, so that a bearing 36 may be press fit into it to provide support for the spanner's S shaft. The bearing 36 may be retained in the flange 34 with a circle clip 38 which is retained in a groove 39. As an example only, the inner diameter of the bearing 36 may be 55 mm, and a length of aluminum pipe 40 having an inner diameter of about 1.75" may be machined and press-fit into the bearing 34. The end of that piece of pipe 40 may be welded to a ¼" aluminum plate, interface 14, concentric with the central hole 30. The interface plate 14 may include a handle 26 on its upper side and a mounting hole for a coupling elbow joint 16, e.g. a hirth joint or simple elbow joint, and attached to a length of 45 mm×45 mm hollow aluminum T-slot framing (arm 18, 19a). The framing (arm 18, 19a) may be about 12" long and may be attached to another piece of 12" framing (arm 18, 19b) stacked on top with a bracket (arm adjustment mechanism 24) that allows the length of the tool 10 to be adjusted and locked in place.

The lower framing (arm 18, 19b) is attached to a foot plate 22 with a lower elbow 20, allowing the angle of the tool 10 to be adjusted to correspond to the work piece. The lower elbow 20 is attached to the top of a footplate 22, which may be a piece of 90 mm×45 mm framing at the front and connected with some elbow joints to two 8" pieces of 45 mm×45 mm framing in the shape of a "U". A piece of ¼" thick aluminum plate may be welded to the rear top edge of the 90 mm piece of framing and to the top edge of the arms of the "U" framing to create an angled footplate.

With regard to C-5 aircraft, this tool 10 eliminates two persons from the prior art methodology. Accordingly, it is expected that the U.S. Air Force will be able to use this at all regular and National Guard bases where maintenance is done on C-5 aircraft, or any other aircraft, e.g. C-130, or vehicles utilizing a single hub nut arrangement. The tool 10 significantly increases the safety of the persons performing the work. It also greatly decreases the amount of manpower required.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A tire change tool, consisting of:
   a generally circular and planar faceplate having a hub side and a user side, the hub side and user side being generally parallel;
   a handle fixed to an upper edge of an interface opposite the faceplate;
   an upper elbow flexibly connected to the faceplate by the interface;
   an arm connected to the upper elbow at a first end, and connected to a lower elbow at a lower end; and
   a footplate flexibly connected to the lower end of the arm by the lower elbow;
   co-aligned apertures in the faceplate and the interface, the co-aligned apertures having an axis perpendicular to a plane of the faceplate;
   one or more relief grooves in the hub side of the faceplate, the one or more relief grooves concentric around the co-aligned apertures;
   a bearing concentric with the co-aligned apertures of the faceplate and interface, the bearing having a central aperture coaxial with the co-aligned apertures of the faceplate and interface, wherein the faceplate is rotatably attached to the interface.

2. The tire change tool of claim 1, consisting of a length adjustment mechanism incorporated into the arm and adapted to permit the arm's length to be changed.

3. The tire change tool of claim 1, wherein the arm consists of an upper section and a lower section adjustably connected by an adjustment mechanism adapted to permit the arm's length to be changed.

\* \* \* \* \*